(12) United States Patent
Park

(10) Patent No.: US 11,629,248 B2
(45) Date of Patent: Apr. 18, 2023

(54) RUBBER COMPOSITION HAVING IMPROVED ELECTRICAL INSULATION PROPERTIES FOR REDUCING GALVANIC CORROSION

(71) Applicants: HYUNDAI MOTOR COMPANY, Seoul (KR); KIA MOTORS CORPORATION, Seoul (KR)

(72) Inventor: Jong Min Park, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 250 days.

(21) Appl. No.: 17/107,253

(22) Filed: Nov. 30, 2020

(65) Prior Publication Data

US 2021/0179832 A1 Jun. 17, 2021

(30) Foreign Application Priority Data

Dec. 11, 2019 (KR) ........................ 10-2019-0164784

(51) Int. Cl.
| | |
|---|---|
| *C08K 3/04* | (2006.01) |
| *C08K 3/36* | (2006.01) |
| *C08L 23/16* | (2006.01) |
| *C08K 3/22* | (2006.01) |
| *C08K 5/01* | (2006.01) |
| *C08K 5/09* | (2006.01) |
| *C08K 5/18* | (2006.01) |

(52) U.S. Cl.
CPC ................ *C08L 23/16* (2013.01); *C08K 3/04* (2013.01); *C08K 3/22* (2013.01); *C08K 3/36* (2013.01); *C08K 5/01* (2013.01); *C08K 5/09* (2013.01); *C08K 5/18* (2013.01); *C08K 2003/2296* (2013.01); *C08K 2201/006* (2013.01); *C08L 2203/18* (2013.01); *C08L 2205/02* (2013.01)

(58) Field of Classification Search
CPC ................ C08L 23/16; C08L 2205/02; C08L 2205/025; C08K 3/36
See application file for complete search history.

(56) References Cited

U.S. PATENT DOCUMENTS

| 5,298,217 A | 3/1994 | Mitchell |
| 10,465,050 B2 | 11/2019 | Van Duin et al. |
| 2018/0231152 A1 | 8/2018 | Clark et al. |

FOREIGN PATENT DOCUMENTS

| CN | 104086903 A | * 10/2014 |
| CN | 108948545 A | * 12/2018 |
| KR | 101912108 B1 | 10/2018 |
| WO | 2012147386 A1 | 11/2012 |
| WO | WO2014154602 A1 | * 10/2014 |

* cited by examiner

*Primary Examiner* — Irina S Zemel
*Assistant Examiner* — Jeffrey S Lenihan
(74) *Attorney, Agent, or Firm* — Lempia Summerfield Katz LLC

(57) ABSTRACT

A rubber composition having improved electrical insulation properties for reducing galvanic corrosion, a method of preparing the composition, and a rubber hose for vehicles using the composition are disclosed. The rubber composition includes a base polymer, a reinforcing agent, an anti-aging agent, an activating agent, a plasticizer, and a cross-linking agent, and has electrical insulation resistance ($10^7$ Ω·cm) of 50 or more.

13 Claims, 4 Drawing Sheets

Rusting phenomenon of development vehicle for testing durability

Field rusting phenomenon of mass-produced vehicle

Fig. 3a

| | Items | | Example7 | Example1 | Example2 | Example3 | Example4 | Example5 | Example6 |
|---|---|---|---|---|---|---|---|---|---|
| Compounding | Polymer | EPDM (High ENB) | 40 | 30 | 50 | 40 | 40 | 40 | 40 |
| | | EPDM (High ENB) | 60 | 70 | 50 | 60 | 60 | 60 | 60 |
| | Reinforcing agent | Carbon black (FEF) | 40 | 40 | 40 | 30 | 50 | 40 | 40 |
| | | Silica | 35 | 35 | 35 | 45 | 25 | 35 | 35 |
| | Anti-aging agent | N'-isopropyl-N-phenyl -- Phenylene diamine | 1 | 1 | 1 | 1 | 1 | 1 | 1 |
| | Processing adjuvant | ZnO | 3 | 3 | 3 | 3 | 3 | 3 | 3 |
| | | S/Acid | 1 | 1 | 1 | 1 | 1 | 1 | 1 |
| | Plasticizer | Paraffin oil | 2.5 | 2.5 | 2.5 | 2.5 | 2.5 | 1.5 | 3.5 |
| | Crosslinking agent | Sulfur | 1 | 1 | 1 | 1 | 1 | 1 | 1 |
| | | CZ | 1 | 1 | 1 | 1 | 1 | 1 | 1 |
| Hardness(Hs) | | | 66 | 67 | 64 | 65 | 66 | 66 | 63 |
| Tensile strength(kgf/cm$^2$) | | | 110 | 120 | 113 | 105 | 119 | 123 | 102 |
| Elongation(%) | | | 430 | 390 | 400 | 380 | 410 | 350 | 330 |
| Electrical insulation resistance(10$^7$ Ω-cm) | | | 140 | 120 | 130 | 139 | 115 | 138 | 135 |
| Product-bursting strength(kgf/cm$^2$) | | | 20 | 19 | 19.5 | 17 | 20.3 | 19.1 | 18.7 |
| Product formability | | | Good | Good | Good | Good | Good | Good | Good |

Fig. 3b

| | Items | | Example7 | Comparative Example1 | Comparative Example2 | Comparative Example3 | Comparative Example4 | Comparative Example5 | Comparative Example6 | Comparative Example7 |
|---|---|---|---|---|---|---|---|---|---|---|
| Compounding | Polymer | EPDM (High ENB) | 40 | 20 | 60 | 40 | 40 | 40 | 40 | 100 |
| | | EPDM (High ENB) | 60 | 80 | 40 | 60 | 60 | 60 | 60 | 0 |
| | Reinforcing agent | Carbon black (FEF) | 40 | 40 | 40 | 20 | 60 | 40 | 40 | 70 |
| | | Silica | 35 | 35 | 35 | 55 | 15 | 35 | 35 | 0 |
| | Anti-aging agent | N'-isopropyl-N-phenyl --Phenylene diamine | 1 | 1 | 1 | 1 | 1 | 1 | 1 | 1 |
| | Processing adjuvant | ZnO | 3 | 3 | 3 | 3 | 3 | 3 | 3 | 3 |
| | | S/Acid | 1 | 1 | 1 | 1 | 1 | 1 | 1 | 1 |
| | Plasticizer | Paraffin oil | 2.5 | 2.5 | 2.5 | 2.5 | 2.5 | 0.5 | 4.5 | 2.5 |
| | Crosslinking agent | Sulfur | 1 | 1 | 1 | 1 | 1 | 1 | 1 | 1 |
| | | CZ | 1 | 1 | 1 | 1 | 1 | 1 | 1 | 1 |
| Hardness(Hs) | | | 66 | 70 | 63 | 59 | 66 | 70 | 58 | 65 |
| Tensile strength(kgf/cm$^2$) | | | 110 | 115 | 95 | 73 | 106 | 123 | 89 | 110 |
| Elongation(%) | | | 430 | 310 | 310 | 180 | 380 | 450 | 250 | 350 |
| Electrical insulation resistance($10^7 \Omega$-cm) | | | 140 | 128 | 132 | 160 | 1.6 | 139 | 110 | 1.6 |
| Product-bursting strength(kgf/cm$^2$) | | | 20 | - | 14.5 | - | 19.2 | - | 12.3 | 19.5 |
| Product formability | | | Good | Impossible | Good | Impossible | Good | Impossible | Good | Good |

Fig. 4

| Product type | Conventional product | | Developed product | |
|---|---|---|---|---|
| | ① | ② | ① | ② |
| 30cycle | Initial corrosion | Initial corrosion | Good | Good |
| 40cycle | Surface corrosion 80%↑ | Surface corrosion 80%↑ | Good | Good |
| 80cycle | Complete corrosion | Complete corrosion | Good | Good |

RUBBER COMPOSITION HAVING IMPROVED ELECTRICAL INSULATION PROPERTIES FOR REDUCING GALVANIC CORROSION

CROSS REFERENCE TO RELATED APPLICATION

The present application claims priority to Korean Patent Application No. 10-2019-0164784, filed on Dec. 11, 2019, the entire content of which is incorporated herein for all purposes by this reference.

BACKGROUND OF THE DISCLOSURE

1. Technical Field

The present disclosure relates to a rubber composition having improved electrical insulation properties for reducing galvanic corrosion, a method of preparing the same and a rubber hose for vehicles using the same.

2. Description of the Related Art

Currently, rubber hoses are mainly used to transfer various fluids to cooling systems, fuel systems, braking systems, and the like in vehicles.

It is common to use metal clamps to fix hoses in such systems. However, there is a corrosion problem due to galvanic corrosion owing to the potential difference between the metal and the rubber material, which may lead to the deterioration of merchantability and performance due to loss of hose. FIG. 1 is a photograph showing a rusting phenomenon of a development vehicle for testing durability. FIG. 2 shows a field rusting phenomenon of a mass-produced vehicle.

When two different metals are in contact with each other in an electrolyte, a potential difference is created. The potential difference causes current to flow between the metals, thereby suppressing corrosion of the metal (cathode) having high corrosion resistance and promoting corrosion of the metal (anode) having high activity. This corrosion is called galvanic corrosion.

In order to reduce such corrosion, attempts are currently made to subject the clamp to zinc galvanizing. However, the addition of a plating layer to reduce corrosion increases manufacturing costs and also fails to solve the problem due to plating cracks caused by tools during clamp assembly.

Therefore, there is a need for a technique for solving the above problems.

SUMMARY OF THE DISCLOSURE

Accordingly, the present disclosure has been made keeping in mind the problems encountered in the related art. An objective of the present disclosure is to provide a rubber composition for a hose, which has improved electrical insulation properties so as to prevent galvanic corrosion. Specifically, an objective of the present disclosure is to provide a rubber composition for a hose, in which the electrical resistance of the hose is drastically improved.

In order to accomplish the above objective, the present disclosure provides the following technical solution.

An aspect of the present disclosure provides a rubber composition for preventing galvanic corrosion. The rubber composition includes a base polymer, a reinforcing agent, an anti-aging agent, an activating agent, a plasticizer, and a crosslinking agent. The base polymer includes a first ethylene propylene diene monomer (EPDM) rubber and a second EPDM rubber. The first EPDM rubber is EPDM including 8% to 10% of 5-ethylidene-2-norbornene (ENB). The second EPDM rubber is EPDM including 70% to 75% of ethylene. A weight ratio of the first EPDM rubber and the second EPDM rubber is 30 to 50:50 to 70.

In an aspect of the present disclosure, the rubber composition may have electrical insulation resistance ($10^7 \Omega \cdot cm$) of 50 or more.

In an aspect of the present disclosure, the reinforcing agent may include carbon black and an inorganic filler. Based on 100 parts by weight of the base polymer, an amount of the carbon black may be 30 to 50 parts by weight and an amount of the inorganic filler may be 25 to 45 parts by weight.

In an aspect of the present disclosure, the carbon black may have dibutyl phthalate (DBP) absorption (ml/100 g) of 40 to 150 and I2 (mg/g) of 10 to 50.

In an aspect of the present disclosure, the inorganic filler may be silica. The silica may have Brunauer, Emmett, and Teller (BET) surface area ($m^2/g$) of 180 to 230 and a density (g/l) of 120 to 160.

In an aspect of the present disclosure, an amount of the anti-aging agent may be 0.5 to 1.5 parts by weight based on 100 parts by weight of the base polymer. The anti-aging agent may be N'-isopropyl-N-phenyl-phenylene diamine.

In an aspect of the present disclosure, an amount of the activating agent may be 1.5 to 6 parts by weight based on 100 parts by weight of the base polymer. The activating agent may be at least one of zinc oxide and stearic acid.

In an aspect of the present disclosure, the activating agent may include zinc oxide and stearic acid. An amount of the zinc oxide may be 2 to 4 parts by weight based on 100 parts by weight of the base polymer. An amount of the stearic acid may be 0.5 to 1.5 parts by weight based on 100 parts by weight of the base polymer.

In an aspect of the present disclosure, an amount of the plasticizer may be 1.5 to 3.5 parts by weight based on 100 parts by weight of the base polymer.

In an aspect of the present disclosure, the plasticizer may be paraffin oil.

In an aspect of the present disclosure, an amount of the crosslinking agent may be 0.5 to 3.5 parts by weight based on 100 parts by weight of the base polymer.

In an aspect of the present disclosure, the crosslinking agent may be sulfur.

Another aspect of the present disclosure provides a rubber hose for a vehicle, including the above rubber composition.

Still another aspect of the present disclosure provides a method of preparing the above rubber composition. The method includes mixing a base polymer with a reinforcing agent, an anti-aging agent, an activating agent, and a plasticizer and mixing the mixed polymer with a crosslinking agent.

In still another aspect of the present disclosure, the base polymer may include a first EPDM rubber and a second EPDM rubber. The first EPDM rubber may be EPDM including 8% to 10% of ENB. The second EPDM rubber may be EPDM including 70% to 75% of ethylene. A weight ratio of the first EPDM rubber and the second EPDM rubber may be 30 to 50:50 to 70.

In still another aspect of the present disclosure, the reinforcing agent may include carbon black and an inorganic filler. Based on 100 parts by weight of the base polymer, an amount of the carbon black may be 30 to 50 parts by weight and an amount of the inorganic filler may be 25 to 45 parts by weight.

In still another aspect of the present disclosure, an amount of the anti-aging agent may be 0.5 to 1.5 parts by weight based on 100 parts by weight of the base polymer. An amount of the activating agent may be 1.5 to 6 parts by weight based on 100 parts by weight of the base polymer.

In still another aspect of the present disclosure, an amount of the plasticizer may be 1.5 to 3.5 parts by weight based on 100 parts by weight of the base polymer.

According to an aspect of the present disclosure, the rubber composition has high electrical insulation resistance. Specifically, the electrical insulation resistance ($10^7$ Ω·cm) can be 50 or more, and the electrical insulation resistance can be 50 to 500.

According to an aspect of the present disclosure, the rubber composition has high hardness. Specifically, the hardness (Hs) can be 60 to 70.

According to an aspect of the present disclosure, the rubber composition has high tensile strength. Specifically, the tensile strength (kgf/cm$^2$) can be 100 to 130.

According to an aspect of the present disclosure, the rubber composition has high elongation. Specifically, the elongation (%) can be 300 to 500.

According to an aspect of the present disclosure, the rubber composition has high product-bursting strength. Specifically, the product-bursting strength (kgf/cm$^2$) can be 15 to 25.

According to an aspect of the present disclosure, the rubber composition has superior product formability.

BRIEF DESCRIPTION OF DRAWINGS

FIGS. 3a and 3b show the components of Examples 1-7 and Comparative Examples 1-7 and the results of evaluation of properties thereof; and FIG. 4 shows the test results of Test Example 3.

DESCRIPTION OF SPECIFIC EMBODIMENTS

Figure 1:
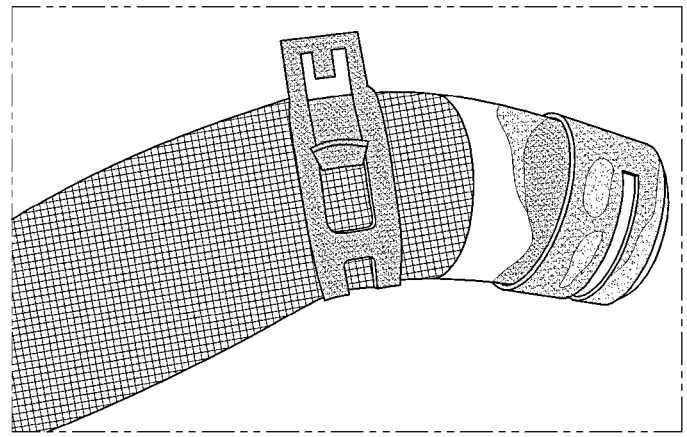
FIG. 1 is a photograph showing a rusting phenomenon of a development vehicle for testing durability.
Figure 2:
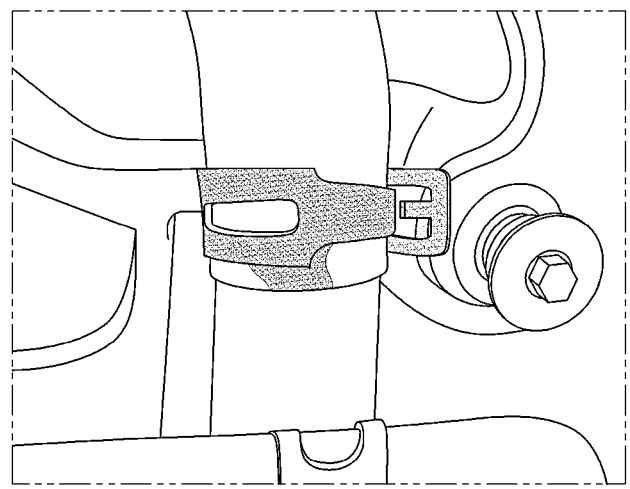
FIG. 2 shows a field rusting phenomenon of a mass-produced vehicle.

Repeated descriptions and detailed descriptions of known functions and configurations that may obscure the gist of the present disclosure have been omitted. As used herein, the term "comprising" or "including" means that other elements may be further included unless otherwise specified.

In the present specification, when a range is described for a variable, it should be understood that the variable includes all values including the end points described within the stated range. For example, the range of "5 to 10" should be understood to include any subranges, such as 6 to 10, 7 to 10, 6 to 9, 7 to 9, and the like, as well as individual values of 5, 6, 7, 8, 9 and 10, and should also be understood to include any value between valid integers within the stated range, such as 5.5, 6.5, 7.5, 5.5 to 8.5, 6.5 to 9, and the like. Also, for example, the range of "10% to 30%" should be understood to include any subranges, such as 10% to 15%, 12% to 18%, 20% to 30%, etc., as well as all integers including values of 10%, 11%, 12%, 13% and the like up to 30%, and should also be understood to include any value between valid integers within the stated range, such as 10.5%, 15.5%, 25.5%, and the like.

Hereinafter, a detailed description is given of the present disclosure.

The present disclosure pertains to a rubber compound composition in which the electrical insulation resistance of a rubber material for a hose is drastically increased (about 100 times) in order to reduce galvanic corrosion due to a potential difference between a rubber hose and a clamp. When the amount of an inorganic filler is increased in order to simply increase electrical resistance in typical materials, electrical resistance may be increased but the product is not formed properly (upon hose extrusion, distortion or shape change occurs) or the properties thereof may be greatly deteriorated. Thus, it may be difficult or impossible to satisfy durability performance, such as burst pressure and negative pressure resistance required of hoses. Hence, the type and amount of base polymer and the amount of plasticizer (paraffin oil) are optimized to overcome the above problems and to significantly increase the durability and corrosion resistance of the clamp. In the rubber composition according to the present disclosure, state/aging properties are maintained at levels equivalent to those of conventional rubber hoses for vehicles, and simultaneously, electrical insulation resistance is greatly improved. The improvement thereof is confirmed through observed material/product/system durability.

Various aspects of the present disclosure are described below.

An aspect of the present disclosure pertains to a rubber composition for preventing galvanic corrosion. The rubber composition includes a base polymer, a reinforcing agent, an anti-aging agent, an activating agent, a plasticizer and a crosslinking agent. The base polymer includes a first ethylene propylene diene monomer (EPDM) rubber and a second EPDM rubber. The first EPDM rubber is EPDM including 8% to 10% of 5-ethylidene-2-norbornene (ENB). The second EPDM rubber is EPDM including 70% to 75% of ethylene. The weight ratio of the first EPDM rubber and the second EPDM rubber is 30 to 50:50 to 70.

In an aspect of the present disclosure, the rubber composition has electrical insulation resistance ($10^7$ Ω·cm) of 50 or more.

In the present disclosure, the EPDM rubber is an ethylene-propylene-diene terpolymer. The diene includes any one selected from the group comprising or consisting of ENB, dicyclopentadiene (DCPD), 1,4-pentadiene, cyclohexadiene and cyclic or bridged diene.

In an embodiment, EPDM having high heat resistance and weather resistance is used by blending EPDM having high ENB content (8 to 10%) with EPDM having high ethylene content (70 to 75%). EPDM having high ENB content may increase softness because of the increased ENB content. Thus, the EPDM may exhibit good processability and may be favorably applied to extruded products, but may deteriorate properties such as scorch stability, elongation, thermal aging, and the like. On the other hand, EPDM having high ethylene content may ensure desirable mechanical properties and may thus exhibit durability such as burst pressure required of hoses. However, when added in excess, increased crystallinity and thus poor processability may result. In order to ensure these advantages at the same time, two kinds of EPDM are blended, and may thus be optimally compounded. In some cases, the first EPDM rubber and the second EPDM rubber are used at a weight ratio of 30 to 50:50 to 70, thereby ensuring both of the above advantages at the same time.

In an aspect of the present disclosure, the reinforcing agent includes carbon black and an inorganic filler. Based on 100 parts by weight of the base polymer, the amount of the carbon black is 30 to 50 parts by weight and the amount of the inorganic filler is 25 to 45 parts by weight.

In an aspect of the present disclosure, the carbon black has dibutyl phthalate (DBP) absorption (ml/100 g) of 40 to 150 and I2 (mg/g) of 10 to 50.

In an aspect of the present disclosure, the inorganic filler is silica. The silica has Brunauer, Emmett, and Teller (BET) surface area ($m^2/g$) of 180 to 230 and a density (g/l) of 120 to 160.

In an embodiment, in the case of the reinforcing agent, an inorganic filler (silica) may be used as a base in order to ensure the electrical insulation properties required of the above material. Moreover, carbon black may be blended in order to ensure fatigue resistance and robustness against permanent deformation, which are typically required of hoses. The reinforcing agent may be used in an optimal blending amount because dispersibility in a rubber phase is very useful from the viewpoint of durability. Superior durability may be obtained when the carbon black is used in an amount of 30 to 50 parts by weight and the inorganic filler is used in an amount of 25 to 45 parts by weight based on 100 parts by weight of the base polymer.

In an aspect of the present disclosure, the amount of the anti-aging agent is 0.5 to 1.5 parts by weight based on 100 parts by weight of the base polymer. The anti-aging agent is N'-isopropyl-N-phenyl-phenylene diamine.

In an aspect of the present disclosure, the amount of the activating agent is 1.5 to 6 parts by weight based on 100 parts by weight of the base polymer. The activating agent is at least one of zinc oxide and stearic acid.

In an aspect of the present disclosure, the activating agent includes zinc oxide and stearic acid. The amount of zinc oxide is 2 to 4 parts by weight based on 100 parts by weight of the base polymer. The amount of stearic acid is 0.5 to 1.5 parts by weight based on 100 parts by weight of the base polymer.

In an aspect of the present disclosure, the amount of the plasticizer is 1.5 to 3.5 parts by weight based on 100 parts by weight of the base polymer.

In an aspect of the present disclosure, the plasticizer is paraffin oil.

In an embodiment, when the inorganic filler is added in excess relative to the amount of carbon black, the Mooney viscosity of the resulting compound may be greatly increased (hardened). Hence, the amount of the plasticizer is adjusted for optimal compounding, thereby attaining desired product extrudability. In some cases, the amount of the plasticizer is 1.5 to 3.5 parts by weight based on 100 parts by weight of the base polymer. Given the above range, desired product extrudability may be attained.

In an aspect of the present disclosure, the amount of the crosslinking agent is 0.5 to 3.5 parts by weight based on 100 parts by weight of the base polymer.

In an aspect of the present disclosure, the crosslinking agent is sulfur.

Another aspect of the present disclosure pertains to a rubber hose for a vehicle including the above rubber composition.

Still another aspect of the present disclosure pertains to a method of preparing the rubber composition. The method includes mixing a base polymer with a reinforcing agent, an anti-aging agent, an activating agent, and a plasticizer and mixing the mixed polymer with a crosslinking agent.

In still another aspect of the present disclosure, the base polymer includes a first EPDM rubber and a second EPDM rubber. The first EPDM rubber is EPDM including 8% to 10% of ENB. The second EPDM rubber is EPDM including 70% to 75% of ethylene. The weight ratio of the first EPDM rubber and the second EPDM rubber is 30 to 50:50 to 70.

In still another aspect of the present disclosure, the reinforcing agent includes carbon black and an inorganic filler. Based on 100 parts by weight of the base polymer, the amount of the carbon black is 30 to 50 parts by weight and the amount of the inorganic filler is 25 to 45 parts by weight.

In still another aspect of the present disclosure, the amount of the anti-aging agent is 0.5 to 1.5 parts by weight based on 100 parts by weight of the base polymer. The amount of the activating agent is 1.5 to 6 parts by weight based on 100 parts by weight of the base polymer.

In still another aspect of the present disclosure, the amount of the plasticizer is 1.5 to 3.5 parts by weight based on 100 parts by weight of the base polymer.

A better understanding of the present disclosure is given through the following preparation examples, examples, and test examples. However, these preparation examples, examples, and test examples are merely set forth to illustrate the present disclosure but are not to be construed as limiting the scope of the present disclosure.

Preparations of Examples 1-7 and Comparative Examples 1-7

In order to prepare engine mount compositions having improved heat resistance and fatigue resistance, components were compounded in the amounts shown in the following tables to thus manufacture specimens.

EPDM was masticated for 3 min using a kneader, mixed together with a reinforcing agent, an anti-aging agent, a processing adjuvant, and a plasticizer, kneaded for 3 to 4 min, and cleaned for 1 to 2 min, thus obtaining a final carbon master batch (CMB) compound. The CMB compound was mixed with a crosslinking agent using a roll mixer. The rubber composition thus obtained was measured for appropriate vulcanization time using a rheometer and was then heated and pressed at 160 kgf/$cm^2$ using a hot press, thereby manufacturing vulcanized specimens.

Specific compositions are shown in Tables 1 and 2 below. These Tables 1 and 2 are shown in FIG. 3.

Test Example 1. Comparison of Properties

In order to evaluate the rubber specimens and products manufactured above, the following items were tested. The results thereof are compared and evaluated.

Hardness: Measurement with dumbbell No. 3 in accordance with KS M 6784

Tensile strength and elongation: Measurement with dumbbell No. 3 in accordance with KS M 6782

Electrical insulation resistance and product-bursting strength: Measurement in accordance with company standard (MS263-19)

The test results are shown in Tables 1 and 2 below. These Tables 1 and 2 are shown in FIG. 3.

TABLE 1

| Items | | | Example 7 | Example 1 | Example 2 | Example 3 | Example 4 | Example 5 | Example 6 |
|---|---|---|---|---|---|---|---|---|---|
| Compounding | Polymer | EPDM (High ENB) | 40 | 30 | 50 | 40 | 40 | 40 | 40 |
| | | EPDM (High Ethylene) | 60 | 70 | 50 | 60 | 60 | 60 | 60 |
| | Reinforcing agent | Carbon black (FEE) | 40 | 40 | 40 | 30 | 50 | 40 | 40 |
| | | Silica | 35 | 35 | 35 | 45 | 25 | 35 | 35 |
| | Anti-aging agent | N'-isopropyl-N-phenyl-phenylenediamine | 1 | 1 | 1 | 1 | 1 | 1 | 1 |
| | Processing adjuvant | ZnO | 3 | 3 | 3 | 3 | 3 | 3 | 3 |
| | | Stearic Acid | 1 | 1 | 1 | 1 | 1 | 1 | 1 |
| | Plasticizer | Paraffin oil | 2.5 | 2.5 | 2.5 | 2.5 | 2.5 | 1.5 | 3.5 |
| | Crosslinking agent | Sulfur | 1 | 1 | 1 | 1 | 1 | 1 | 1 |
| | | CZ | 1 | 1 | 1 | 1 | 1 | 1 | 1 |
| State properties | Hardness (Hs) | | 66 | 67 | 64 | 65 | 66 | 66 | 63 |
| | Tensile strength (kgf/cm$^2$) | | 110 | 120 | 113 | 105 | 119 | 123 | 102 |
| | Elongation (%) | | 430 | 390 | 400 | 380 | 410 | 350 | 330 |
| | Electrical insulation resistance ($10^7$ Ω·cm) | | 140 | 120 | 130 | 139 | 115 | 138 | 135 |
| | Product-bursting strength (kgf/cm$^2$) | | 20 | 19 | 19.5 | 17 | 20.3 | 19.1 | 18.7 |
| | Product formability | | Good | Good | Good | Good | Good | Good | Good |

TABLE 2

| Items | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Compounding | Polymer | EPDM (High ENB) | 20 | 60 | 40 | 40 | 40 | 40 | 100 |
| | | EPDM (High Ethylene) | 80 | 40 | 60 | 60 | 60 | 60 | 0 |
| | Reinforcing agent | Carbon black (FEF) | 40 | 40 | 20 | 60 | 40 | 40 | 70 |
| | | Silica | 35 | 35 | 55 | 15 | 35 | 35 | 0 |
| | Anti-aging agent | N'-isopropyl-N-phenyl-phenylenediamine | 1 | 1 | 1 | 1 | 1 | 1 | 1 |
| | Processing adjuvant | ZnO | 3 | 3 | 3 | 3 | 3 | 3 | 3 |
| | | Stearic Acid | 1 | 1 | 1 | 1 | 1 | 1 | 1 |
| | Plasticizer | Paraffin oil | 2.5 | 2.5 | 2.5 | 2.5 | 0.5 | 4.5 | 2.5 |
| | Crosslinking agent | Sulfur | 1 | 1 | 1 | 1 | 1 | 1 | 1 |
| | | CZ | 1 | 1 | 1 | 1 | 1 | 1 | 1 |

TABLE 2-continued

| Items | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| State properties | Hardness (Hs) | 70 | 63 | 59 | 66 | 70 | 58 | 65 |
| | Tensile strength (kgf /cm$^2$) | 115 | 95 | 73 | 106 | 123 | 89 | 110 |
| | Elongation (%) | 310 | 310 | 180 | 380 | 450 | 250 | 350 |
| | Electrical insulation resistance ($10^7$ Ω · cm) | 128 | 132 | 160 | 1.6 | 139 | 110 | 1.6 |
| | Product-bursting strength (kgf/cm$^2$) | — | 14.5 | — | 19.2 | — | 12.3 | 19.5 |
| | Product formability | Impossible | Good | Impossible | Good | Impossible | Good | Good |

In order to set the EPDM blending ratio, the components were compounded as in Examples 1 and 2 and Comparative Examples 1 and 2, and thus the material properties and part performance were confirmed. When the ratio of EPDM having high ENB content and EPDM having high ethylene content was 30-: 70-50 part per hundred (phr), electrical insulation resistance, and durability required of parts were satisfied. When the amount of EPDM having high ENB content was greater than the upper limit thereof, mechanical properties (bursting strength) required of products were problematic. On the other hand, when the amount thereof was less than the lower limit thereof, the resulting material was excessively hardened, thus causing a problem of poor product processability (hose extrusion).

In order to set the reinforcing agent blending ratio, the components were compounded as in Examples 3 and 4 and Comparative Examples 3 and 4, and thus the material properties and part performance were confirmed. When the ratio of carbon black (FEF type) and inorganic filler (silica) was 30-50:25-phr, electrical insulation resistance, and durability required of parts were satisfied. When the amount of carbon black was greater than the upper limit thereof, electrical insulation resistance was not improved, and when the amount of silica was greater than the upper limit thereof, the filler was not dispersed. Thus, continuous extrusion was not possible upon product formation, undesirably making it difficult or impossible to form parts.

In order to set the amount of the plasticizer so as to ensure formability, the components were compounded as in Examples 5 and 6 and Comparative Examples 5 and 6, and thus the material properties and part performance were confirmed. When the amount of the plasticizer was 1.5 to 3.5 phr, the material properties and part performance were satisfied. When the amount thereof was less than the lower limit thereof, crosslinking density was increased and thus the product was not extruded. On the other hand, when the amount thereof was greater than the upper limit thereof, mechanical properties (bursting strength) of products were unsatisfactory.

Based on the test results, the properties of Example 7 according to the present disclosure were vastly superior.

Test Example 2. Comparison with Properties of Conventional Product

Example 7, the properties of which were found to be vastly superior in Test Example 1, was used as a developed product. The properties thereof were compared with those of a conventional product in accordance with company standard MS263-19.

The conventional product was that of Comparative Example 7.

The results of comparison of the properties thereof are shown in Table 3 below.

TABLE 3

| | | | Evaluation result | | |
|---|---|---|---|---|---|
| Items | | MS263-19 | Conventional product | Developed product | Remark |
| State properties | Hardness | 60 ± 5 or 70 ± 5 | 65 | 66 | Room temperature |
| | Tensile strength (kgf/cm$^2$) | 100 ↑ | 110 | 112 | |
| | Elongation (%) | 300 ↑ | 350 | 430 | |
| Aging | Change in hardness | 0 to +20 | +7 | +10 | 130° C. × 168 hr |
| | Tensile strength change (%) | +25% ↓ | +16 | +5 | |
| | Elongation change (%) | −60% ↓ | −51 | −45 | |

TABLE 3-continued

| Items | | MS263-19 | Evaluation result Conventional product | Evaluation result Developed product | Remark |
|---|---|---|---|---|---|
| Liquid resistance | Change in hardness | −5 to +10 | −3 | +2 | Antifreeze 50% aqueous solution 115° C × 360 hr |
| | Tensile strength change (%) | −20% ↓ | −2 | +2 | |
| | Elongation change (%) | −40% ↓ | −35 | −25 | |
| Compressed permanent shrinkage (%) | High temperature | 65 ↓ | 40 | 46 | 120° C × 70 hr |
| Ozone resistance | | No Crack | No Crack | No Crack | 100 pphm × 72 hr |
| Electrical insulation resistance (Ω·cm) | | $10^6$ | $1.6 \times 10^7$ | $1.4 \times 10^9$ | 100 times improvement over conventional product |

As described above, it can be confirmed that the developed product (Example 7) of the present disclosure exhibited properties capable of minimizing galvanic corrosion between metal clips that are essentially used for hose fixing.

Accordingly, whether galvanic corrosion was actually minimized was evaluated through the following Test Example 3.

Test Example 3. Evaluation of Corrosion of Clip for Hose Connection of Conventional Product and Developed Product The conventional product and the developed product were measured for corrosion of a clip used for hose connection in accordance with CCT-A and MS619-10.

The evaluation times were 30 cycles, 40 cycles, and 80 cycles, and the test results are shown in FIG. 4.

As shown in FIG. 4, corrosion resistance of the clamp was improved compared to the conventional product. In the conventional product, initial corrosion occurred at the 30th cycle and complete corrosion occurred at the 80th cycle. In contrast, the developed product did not corrode even at the 80th cycle. Therefore, it can be concluded that the corrosion resistance in the present disclosure was improved 200% or more compared to the conventional product.

Although the embodiments of the present disclosure have been disclosed for illustrative purposes, those skilled in the art should appreciate that various modifications, additions, and substitutions are possible without departing from the scope and spirit of the disclosure as disclosed in the accompanying claims.

What is claimed is:

1. A rubber composition for preventing galvanic corrosion, the rubber composition comprising:
   a base polymer, a reinforcing agent, an anti-aging agent, an activating agent, a plasticizer, and a crosslinking agent,
   wherein the base polymer comprises a first ethylene propylene diene monomer (EPDM) rubber and a second EPDM rubber,
   wherein the first EPDM rubber is EPDM comprising 8% to 10% of 5-ethylidene-2-norbornene (ENB),
   wherein the second EPDM rubber is EPDM comprising 70% to 75% of ethylene,
   wherein a weight ratio of the first EPDM rubber and the second EPDM rubber is 30 to 50:50 to 70,
   wherein the reinforcing agent comprises carbon black and an inorganic filler and wherein, based on 100 parts by weight of the base polymer, an amount of the carbon black is 30 to 50 parts by weight and an amount of the inorganic filler is 25 to 45 parts by weight, and
   wherein the inorganic filler is silica and wherein the silica has Brunauer, Emmett, and Teller (BET) surface area (m$^2$/g) of 180 to 230 and a density (g/l) of 120 to 160.

2. The rubber composition of claim 1, wherein the rubber composition has electrical insulation resistance ($10^7$ Ω·cm) of 50 or more.

3. The rubber composition of claim 1, wherein the carbon black has dibutyl phthalate (DBP) absorption (ml/100 g) of 40 to 150 and I2 (mg/g) of 10 to 50.

4. The rubber composition of claim 1, wherein an amount of the anti-aging agent is 0.5 to 1.5 parts by weight based on 100 parts by weight of the base polymer, and wherein the anti-aging agent is N'-isopropyl-N-phenyl-phenylene diamine.

5. The rubber composition of claim 1, wherein an amount of the activating agent is 1.5 to 6 parts by weight based on 100 parts by weight of the base polymer, and wherein the activating agent is at least one of zinc oxide and stearic acid.

6. The rubber composition of claim 5, wherein the activating agent comprises zinc oxide and stearic acid, wherein an amount of the zinc oxide is 2 to 4 parts by weight based on 100 parts by weight of the base polymer, and wherein an amount of the stearic acid is 0.5 to 1.5 parts by weight based on 100 parts by weight of the base polymer.

7. The rubber composition of claim 1, wherein an amount of the plasticizer is 1.5 to 3.5 parts by weight based on 100 parts by weight of the base polymer.

8. The rubber composition of claim 7, wherein the plasticizer is paraffin oil.

9. The rubber composition of claim 1, wherein an amount of the crosslinking agent is 0.5 to 3.5 parts by weight based on 100 parts by weight of the base polymer.

10. The rubber composition of claim 9, wherein the crosslinking agent is sulfur.

11. A method of preparing a rubber composition, the method comprising:
- mixing a base polymer with a reinforcing agent, an anti-aging agent, an activating agent, and a plasticizer; and
- mixing the mixed polymer with a crosslinking agent,
- wherein the base polymer comprises a first EPDM rubber and a second EPDM rubber,
- wherein the first EPDM rubber is EPDM comprising 8% to 10% of 5-ethylidene-2-norbornene (ENB),
- wherein the second EPDM rubber is EPDM comprising 70% to 75% of ethylene,
- wherein a weight ratio of the first EPDM rubber and the second EPDM rubber is 30 to 50:50 to 70,
- wherein the reinforcing agent comprises carbon black and an inorganic filler, and wherein, based on 100 parts by weight of the base polymer, an amount of the carbon black is 30 to 50 parts by weight and an amount of the inorganic filler is 25 to 45 parts by weight, and
- wherein the inorganic filler is silica and wherein the silica has Brunauer, Emmett, and Teller (BET) surface area ($m^2/g$) of 180 to 230 and a density (g/l) of 120 to 160.

12. The method of claim 11, wherein an amount of the anti-aging agent is 0.5 to 1.5 parts by weight based on 100 parts by weight of the base polymer, and wherein an amount of the activating agent is 1.5 to 6 parts by weight based on 100 parts by weight of the base polymer.

13. The method of claim 11, wherein an amount of the plasticizer is 1.5 to 3.5 parts by weight based on 100 parts by weight of the base polymer.

* * * * *